(No Model.) 4 Sheets—Sheet 1.
G. H. GEYER.
APPARATUS FOR TREATING RODS OR BARS.
No. 571,306. Patented Nov. 10, 1896.
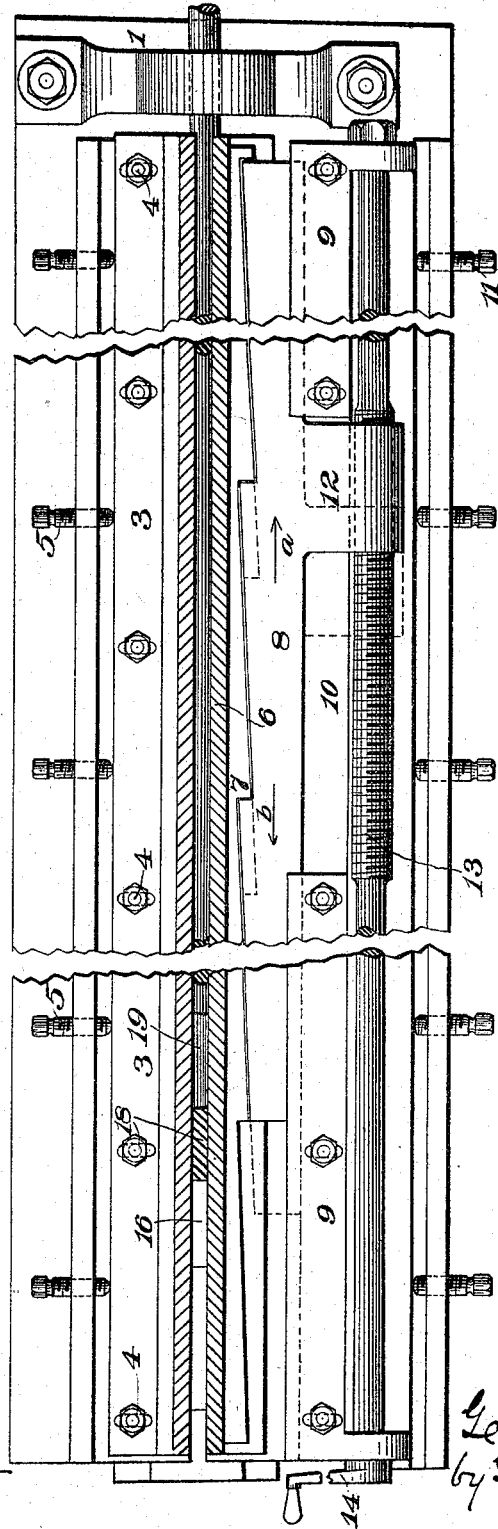
FIG. I.
WITNESSES:
Darwin S. Wolcott
C. E. Hunt.
INVENTOR,
George H. Geyer,
by George H. Christy
Att'y.

(No Model.) 4 Sheets—Sheet 2.
G. H. GEYER.
APPARATUS FOR TREATING RODS OR BARS.
No. 571,306. Patented Nov. 10, 1896.
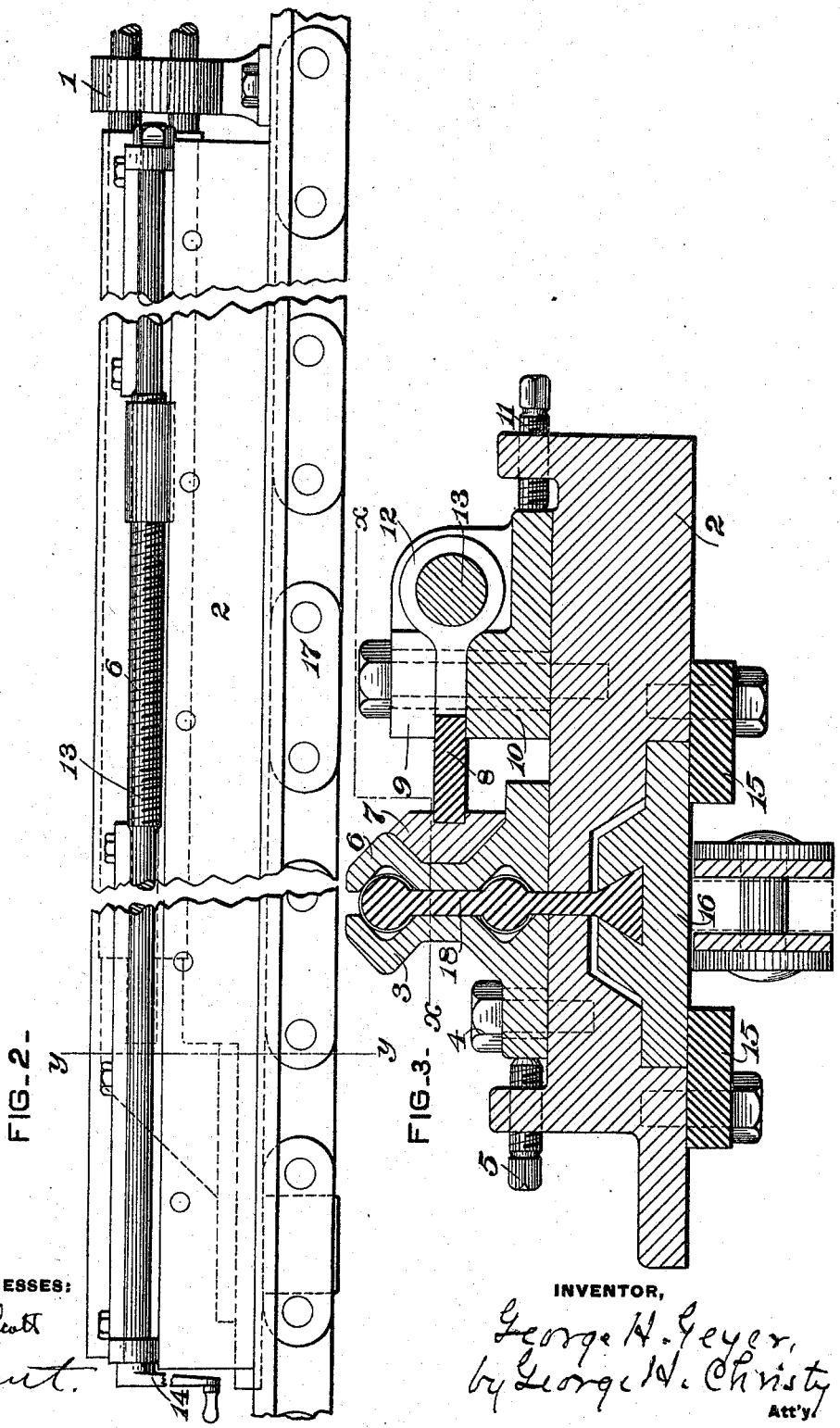
WITNESSES:
Darwin S. Wolcott
C. E. Hunt.
INVENTOR,
George H. Geyer,
by George H. Christy
Att'y.

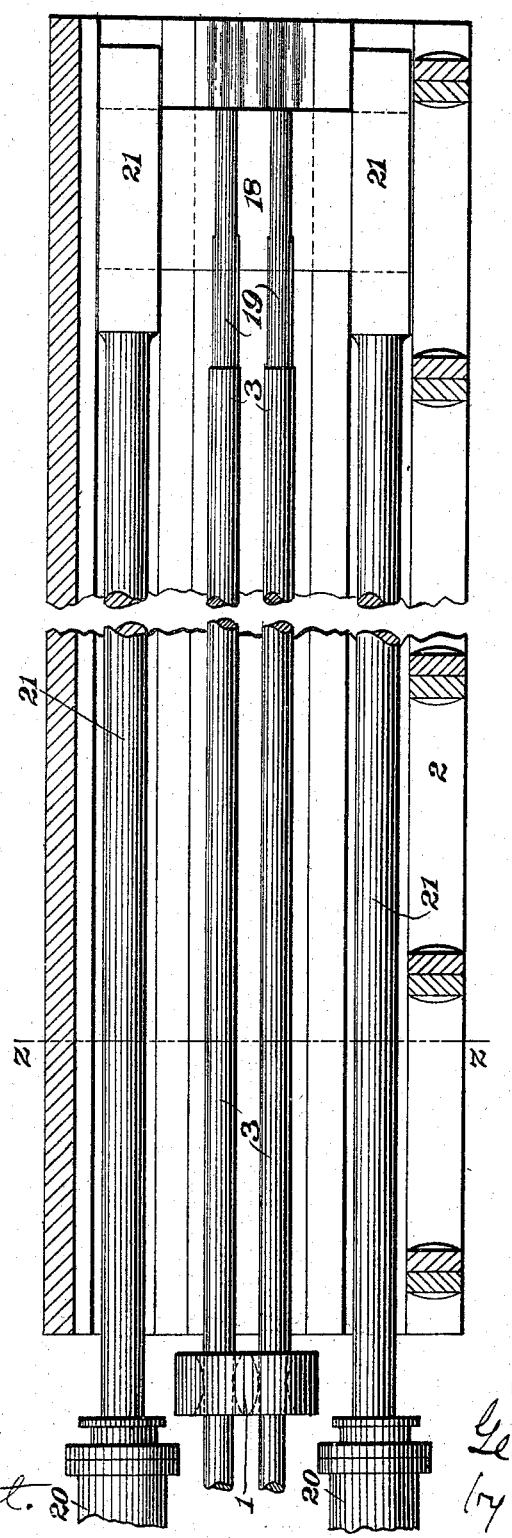

(No Model.) 4 Sheets—Sheet 4.
G. H. GEYER.
APPARATUS FOR TREATING RODS OR BARS.
No. 571,306. Patented Nov. 10, 1896.
FIG. 7.
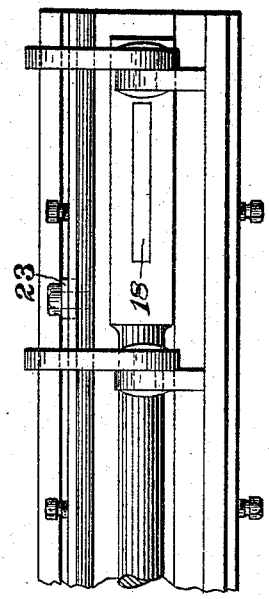
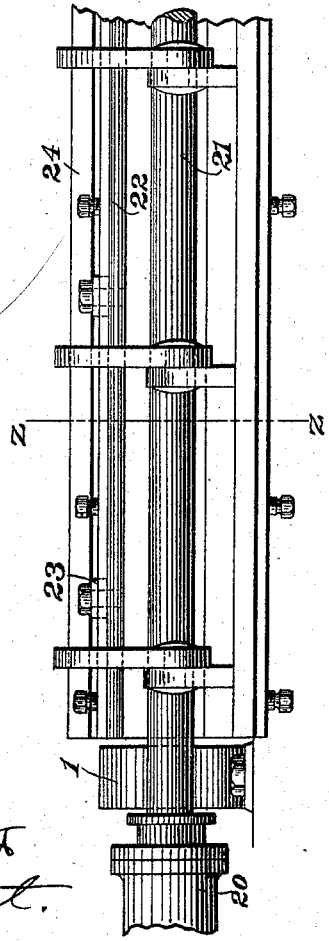
FIG. 5.
FIG. 6.
WITNESSES:
Daniel B. Wolcott
C. E. Hunt
INVENTOR,
George H. Geyer,
by George H. Christy
Att'y.

UNITED STATES PATENT OFFICE.

GEORGE H. GEYER, OF PITTSBURG, PENNSYLVANIA, ASSIGNOR TO JONES & LAUGHLINS, LIMITED, OF SAME PLACE.

APPARATUS FOR TREATING RODS OR BARS.

SPECIFICATION forming part of Letters Patent No. 571,306, dated November 10, 1896.

Application filed February 28, 1894. Serial No. 501,790. (No model.)

*To all whom it may concern:*

Be it known that I, GEORGE H. GEYER, a citizen of the United States, residing at Pittsburg, in the county of Allegheny and State of Pennsylvania, have invented or discovered certain new and useful Improvements in Apparatus for Treating Rods or Bars, of which improvements the following is a specification.

The invention described herein relates to certain improvements in apparatus for the treatment of bars, rods, &c., for the production of shafts and other articles. Heretofore it has been customary to employ one of two methods for the reduction of bars and rods while cold to the desired diameter and to produce a dense highly-polished surface on these rods. One of these methods consists in what is termed "cold-rolling," in which the bars or rods are passed through grooves formed in suitable rolls, so as to reduce the bar to the required diameter and to produce the desired finished surface. In this cold-rolling in order that every portion of the surface of the bar may be subjected to the action of the rolls a number of passes through the rolls is requisite. These repeated passes, on account of the labor and time necessary to effect them, add considerably to the cost of manufacturing the shafting. The other method consists in drawing the bar or rod through a die having an internal diameter equal to the desired external diameter in the finished article. This method is objectionable, first, because a short piece at one end of the bar is rendered useless by the gripping-dies, which draw the bar through the die. The method is further objectionable for the reason that certain spots or portions of the bars or rods will be harder or softer than other portions, in spite of the utmost care in trying to produce homogeneous metal. When in drawing the bars or rods one of these harder spots comes in contact with the die, a much greater pull has to be applied to the finished portion to pull the bar through the die. This increased pull or strain on the rod effects a slight elongation thereof, with a consequent reduction in the diameter of the rod at the softer portions, and, further, the enormous strain to which the bar or rod is subjected in being thus drawn through the die produces an injurious effect upon the metal of the bar, thus rendering it inferior to a cold-rolled bar, not only on account of the injury to the metal, but also on account of the difference in diameter at different points along its length due to the elongation and consequent cross-sectional reduction of the softer portions of the bar when its inward movement is resisted by the hard portions in contact with the die.

The object of the present invention is to provide for such a reduction or treatment of the bars or rods as will have all the beneficial effects heretofore incident to cold-rolling and shall also be capable of being effected in as short a time as the drawn operation without producing any of the injurious effects heretofore mentioned.

In general terms the invention consists in the construction and operation substantially as hereinafter more fully described and claimed.

In the accompanying drawings, forming a part of this specification, Figure 1 is a view partially in plan and partly in section, the plane of section being indicated by the line $x\ x$, Fig. 3. Fig. 2 is a view in side elevation of the apparatus. Fig. 3 is a transverse section, the plane of section being indicated by the line $y\ y$, Fig. 2. Fig. 4 is a top plan view of a modified form of the apparatus, the upper holding-dies being removed. Fig. 5 is a side elevation of the apparatus shown in Fig. 4. Fig. 6 is a transverse section, the plane of section being indicated by the line $z\ z$, Fig. 5; and Fig. 7 is a sectional detail view.

In the practice of my invention a suitable standard 1 is firmly secured at one end of a bed-plate 2 and is provided with suitable recesses for the reception of one or more dies of any suitable construction for the reduction of the bars or rods. On one side of a slot formed longitudinally in the bed-plate is adjustably secured a guide 3, the guide being held by bolts 4, passing through slots in the base of the guide and screwing into the bed-plate, the adjustment being effected by a series of set-screws 5 along the bed-plate. On the opposite side of the slot in the bed-plate is placed a movable guide 6. On the side of the guide 6 is formed a rib or projection 7, having inclined faces against which bear the correspondingly-shaped faces formed on the edge of the longitudinally-movable plate 8. This plate is held in position by means of a clamping-plate 9, secured on top of a laterally-movable block 10, which is adjustably secured to the bed-plate 2 by means of bolts passing through slots in the block, the adjustment being effected by set-screws 11. This plate 8 is provided with a lug 12, having a threaded opening therethrough for the reception of the threaded rod 13, whose ends are mounted in bearings at opposite ends of the bed-plate 2, by which the rod is held as against longitudinal movement. This threaded rod is provided with a handle 14, whereby the rod may be rotated so as to shift the plate 8 longitudinally and thereby push the guide 6 in toward the guide 3 or permit its movement away from the latter in accordance with the direction in which the plate 8 is shifted. As shown in Fig. 3, the inner faces of the guides 3 and 6 are grooved for the reception of the rods to be treated, the groove being of such dimensions, and preferably V-shaped, as to bear firmly against the rod. As shown in Figs. 1 and 2, these guides extend from a point adjacent to the reducing-die to a distance equal to or approximately equal to the length of bar to be treated, so as to prevent any buckling or bending of the bar when pressure is applied to the rear end thereof to force it through the die.

As shown in Fig. 3, a longitudinal groove is formed on the under side of the bed 2, and the latter is provided with guideways 15 for the carriage 16, which is connected to a chain 17, driven in any suitable manner. To this carriage is secured a vertical post 18, which projects up through the slot in the bed of the machine and between the guides 3 and 6. This vertical post is provided with thrust-pins 19, adapted to pass along through the grooves in the guides 3 and 6 and bear against the ends of the bars to be treated, they being made of slightly less diameter than the bars, so that they will move freely along the guides.

In operating the machines shown in Figs. 1, 2, and 3 the threaded rod 13 is so rotated as to shift the plate 8 in the direction of the arrow $a$, thereby permitting the guide 6 to move away from the guide 3. The bars or rods to be treated are then placed within the grooves of the guides 3 and 6 and the threaded rod 13 is rotated so as to shift the plate 8 in the direction of the arrow $b$, and thereby force the guide 6 toward the guide 3 and to firmly clamp the bars or rods between them. The thrust-block is then caused to move by means of the chain 17 in the direction of the reducing-dies, thereby pushing the bars or rods along the guides 3 and 6 into and through the dies.

It will be readily understood by those skilled in the art that in treating the bars in the manner described no part or portion of the finished bar will be in any way marred or disfigured, as the thrust-pins bear upon the rear ends of the bars, and that within the finished periphery of the bar, and, further, that in case of any hindrance to the onward movement of the bars or rods through the dies by reason of hard spots or portions therein the excess of power required to push the bars through the die is applied to that portion of the bar or rod which has not been subjected to the reducing action of the dies, and that the portion which has been finished by the die is not subjected to any strain or injurious treatment.

In Figs. 4, 5, and 6 I have shown a form of apparatus in which fluid-pressure cylinders are employed for forcing the bars through the dies. In this apparatus it is preferred to arrange the cylinders 20 at that end of the machine at which the dies are located, so that the piston-rods 21 will be subjected only to a pulling strain and are not therefore liable to be distorted while in use. As shown in Fig. 6, the guide 3 is adjustably arranged within a recess within the bed-plate 2, and the guide 6 is adjustably arranged within a frame 22, pivoted, as shown, to one side of the bed-plate and adapted to be turned down, so as to bring the grooves in the guide 6 into alinement with the grooves in the guide 3. The frame 22 is held in operative position by means of a sliding block 23, engaging a hook 24, secured to or formed on the base-plate 2. The thrust-block 18 has, in the construction shown in Figs. 4, 5, and 6, its ends arranged within mortises in the ends of the piston-rods 21, and the thrust-pins 19 are slotted at one end, so as to fit over the thrust-block, which is also slotted a short distance to receive a portion of the push-pins, as shown in Figs. 4 and 7. The operation of the apparatus shown in Figs. 4, 5, and 6 is essentially similar to that of the apparatus shown in Figs. 1, 2, and 3 and need not be particularly described.

It will be readily understood that, while it is preferable to construct the machine, as regards the guides, pressing mechanism, and the dies, so that two bars or rods can be operated upon simultaneously, it would not be any departure from my invention to arrange the machine for operation upon one rod only or upon more than two.

It is a characteristic of my invention that the rods or bars being treated thereby are at all times subjected not only to a circumferential pressure progressive along the bar or rod, but also to an end pressure, so that the bar or rod is not subjected at any time to any injurious strains, and that the finished bar will conform exactly, as regards its external diameter, to the internal diameter of the opening in the dies.

No claim is made herein to my improved method of treating bars or rods, to which general reference has been made, as the same will form the subject matter of an application filed of even date herewith.

I claim herein as my invention—

1. In a machine for treating bars, rods, &c., the combination of a die for reducing a bar or rod, and mechanism for pushing the entire length of the bar or rod through the die, substantially as set forth.

2. In a machine for treating bars, rods, &c., the combination of a die for reducing a bar or rod, and mechanism operative on the rear end of the bar or rod, for pushing the latter through the die, substantially as set forth.

3. In a machine for treating bars, rods, &c., the combination of a die for reducing a bar or rod, a guide for preventing lateral movement of the bar or rod, in any direction, and mechanism for pushing the bar or rod through the die, substantially as set forth.

4. In a machine for treating bars, rods, &c., the combination of a die for reducing a bar or rod, a stationary and a movable guide, means for shifting the movable guide laterally, and means for pushing the bar or rod through the die, substantially as set forth.

In testimony whereof I have hereunto set my hand.

GEORGE H. GEYER.

Witnesses:
   F. E. GAITHER,
   DARWIN S. WOLCOTT.